No. 736,112. PATENTED AUG. 11, 1903.
C. KLEIFGEN.
REFRIGERATOR ALARM.
APPLICATION FILED NOV. 3, 1902.
NO MODEL.
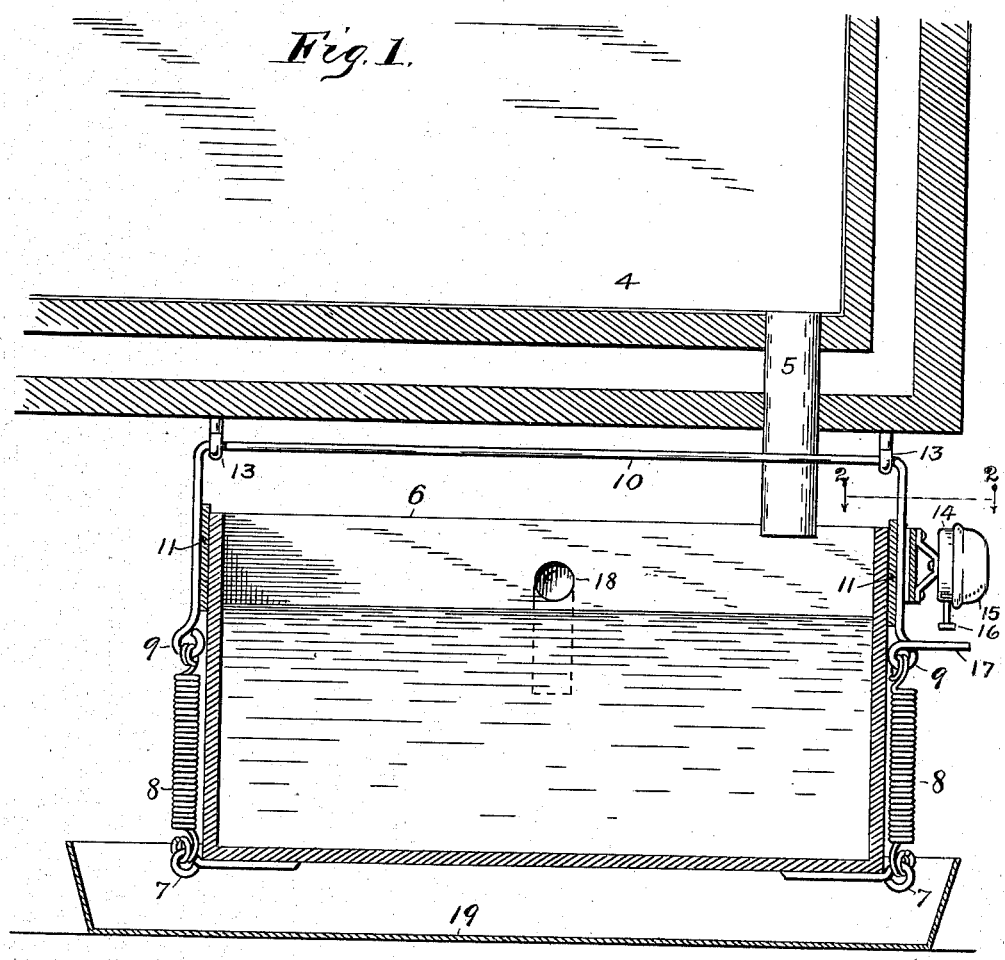
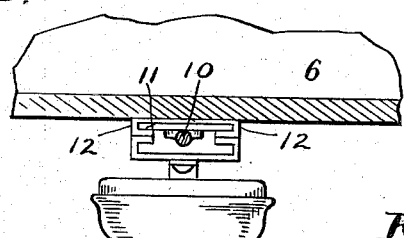
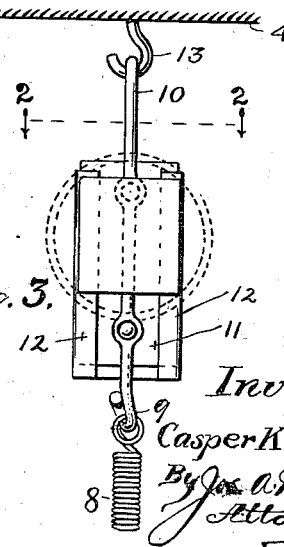
Witnesses
Russell B. MacFall
Arminta Mae Smith
Inventor,
Casper Kleifgen,
By Jos. A. Minturn
Attorney No. 736,112. Patented August 11, 1903.

UNITED STATES PATENT OFFICE.

CASPER KLEIFGEN, OF INDIANAPOLIS, INDIANA.

REFRIGERATOR-ALARM.

SPECIFICATION forming part of Letters Patent No. 736,112, dated August 11, 1903.

Application filed November 3, 1902. Serial No. 129,881. (No model.)

*To all whom it may concern:*

Be it known that I, CASPER KLEIFGEN, a citizen of the United States, residing at Indianapolis, in the county of Marion and State of Indiana, have invented certain new and useful Improvements in Refrigerator-Alarms, of which the following is a specification.

This invention relates to improvements in refrigerators, and has special reference to the drip-pan for catching and holding the melted ice.

The object of the invention is to provide a signal-bell which will ring when the pan is full enough to require emptying and which will continue to sound its alarm until proper attention has been given to it, thereby preventing the damage which might be occasioned by an overflow of water.

I accomplish the objects of the invention by the mechanism illustrated in the accompanying drawings, in which—

Figure 1 is a detail in vertical section of a refrigerator provided with my invention; Fig. 2, a detail in top plan view from the line 2 2 of Figs. 1 and 3; Fig. 3, a detail in front elevation of the slide with the bell shown in dotted lines, and Fig. 4 an end view of a modified support for the drip-pan.

Like characters of reference indicate like parts throughout the several views of the drawings.

4 represents a refrigerator of any usual and well-known construction, and 5 the drain-pipe therefrom.

6 is the drip-pan, into which the drain-pipe discharges. It is preferably a rectangular metal box open at the top. Secured to the bottom of the pan, at each end thereof, are the eyes or hooks 7 7, into which one end of a coiled spring 8 is fastened. The upper ends of said coiled springs are fastened to the eyes 9 9 of a bail 10. The latter passes over the pan longitudinally and centrally thereof, and to prevent the lateral displacement of the bail, or rather of the pan with relation to the bail, which would cause the water to spill out of the pan, I provide guides near the top of the pan to hold the bail. These guides may be simply lugs projecting from the ends of the pan with vertical holes, through which the sides of the bail are passed, or, as shown in the drawings, plates 11 11 may be fastened to the sides of the bail and engaged along each edge by overlapping flanges 12. The pan is suspended by the bail from hooks 13 13, secured to the under side of the refrigerator adjacent to one end of the latter, in order to afford easy access to the outer end of the pan for convenience in winding up the bell 14. The latter is secured in a fixed manner to the end of the pan. It is wound up by rotating its gong 15 and is made to ring by pressing in the push-button 16. The bell is of usual and well-known construction, such as is sold on the open market, and need not be further described here. The bell is placed above the eyelet of the adjacent end of the bail 10, and after forming the eyelet the bail-wire is bent out to form an arm 17. This arm is immediately under the push-button. As the pan 6 fills with water from the refrigerator the weight of it expands the springs 8, thereby permitting the pan to settle gradually away from the bottom of the refrigerator, and as the pan drops down it causes the bell 14, which is fixed to it, to approach the arm 17. The tension of the springs is adjusted so that the weight of the water in the pan when the latter is full will bring the push-button 16 of the bell into contact with the arm 17, thereby ringing the bell and sounding an alarm, which will continue to sound until the pan is lightened in weight by being emptied or until the bell has run down. To empty the pan, its bail is slipped off of the hooks 13 and then it is free to be carried out and the water poured out of it. The pan will preferably have an overflow 18, with a pipe (shown in dotted lines, Fig. 1) to direct the water down into a second pan 19 placed below. This is to prevent damage in case the upper pan was filled and the alarm sounded when there was no person around to hear the alarm and empty the pan.

In the modification shown in Fig. 4 the bail 10 is supported on legs 20, which rest on the floor of the room. This is more convenient when the drain-pipe 5 is at the rear of the refrigerator than to hook the bail on hooks on the bottom of the refrigerator.

In the accompanying drawings I have shown my invention in the best form now known to me; but obvious modifications in the details may be practiced without departing from the spirit of the invention.

Having thus fully described my invention, what I claim as new, and desire to secure by Letters Patent, is—

1. A refrigerator having a drain, a drip-pan located under the refrigerator into which the drain empties, a bail removably secured to a fixed support and passing through guides in the ends of the pan, coiled springs connecting the ends of the bail with the pan, a spring-actuated bell secured to the pan and actuated by a push-button, and a fixed body in the path of the bell to engage the button when the weight of water lowers the pan and attached bell.

2. A refrigerator having a drain, a drip-pan located under the refrigerator into which the drain empties, said pan having end hooks or eyelets, a bail removably secured by hooks to the refrigerator and passing through guides in the ends of the drip-pan and terminating with eyes, coiled springs connecting the eyes of the bail with the said eyes of the pan, a spring-actuated bell secured to the pan and actuated by a push-button and a fixed body in the path of the bell to engage the button.

In witness whereof I have hereunto set my hand and seal, at Indianapolis, Indiana, this 28th day of October, A. D. 1902.

CASPER KLEIFGEN. [L. S.]

Witnesses:
JOSEPH A. MINTURN,
S. MAHLON UNGER.